(12) United States Patent
Bartscherer et al.

(10) Patent No.: US 6,514,418 B1
(45) Date of Patent: Feb. 4, 2003

(54) METHOD OF DEWATERING SLURRIES USING LEAF FILTERS (FILTER PRESSES)

(75) Inventors: Josef Bartscherer, Kempen (DE); Hans Georg Hartan, Kevelar (DE); Winfried Held, Lautzenbruecken/Westerwald (DE); Fedor Ivanovitch Lobanov, Moscow (RU); Stanislav Vladimirovitch Chramenkov, Moscow (RU); Vladimir Alexandovich Sagorskij, Moscow (RU)

(73) Assignee: Stockhausen GmbH & Co. KG, Krefeld (DE)

( * ) Notice: Subject to any disclaimer, the term of this patent is extended or adjusted under 35 U.S.C. 154(b) by 0 days.

(21) Appl. No.: 09/623,557

(22) PCT Filed: Dec. 15, 1999

(86) PCT No.: PCT/EP99/09941
§ 371 (c)(1),
(2), (4) Date: Oct. 27, 2000

(87) PCT Pub. No.: WO00/40515
PCT Pub. Date: Jul. 13, 2000

(30) Foreign Application Priority Data

Jan. 6, 1999 (DE) .......................................... 199 00 187

(51) Int. Cl.⁷ ................................................. C02F 11/14
(52) U.S. Cl. ....................... 210/709; 210/729; 210/767; 210/770; 210/800; 210/808
(58) Field of Search ................................. 210/729, 732, 210/767, 770, 800, 806, 808, 231, 259, 709

(56) References Cited

U.S. PATENT DOCUMENTS

| 4,411,797 | A |   | 10/1983 | Sander et al. | ............... 210/727 |
|---|---|---|---|---|---|
| 4,840,736 | A | * | 6/1989 | Sander et al. | ............... 210/727 |
| 5,160,440 | A |   | 11/1992 | Merai | .......................... 210/710 |
| 5,275,740 | A |   | 1/1994 | Spyker et al. | ............... 210/741 |
| 5,863,429 | A | * | 1/1999 | Bahr | .......................... 210/385 |
| 5,961,827 | A | * | 10/1999 | Bähr | .......................... 210/387 |

FOREIGN PATENT DOCUMENTS

| DE | 36 17 519 | 5/1986 |
|---|---|---|
| DE | 41 19 167 | 12/1992 |
| DE | 9320903 U1 | 2/1993 |
| DE | 9307712 U1 | 5/1993 |
| DE | 199 00 187 | 1/1999 |
| EP | 0053250 | 6/1982 |
| EP | 264 900 | 4/1988 |

OTHER PUBLICATIONS

Patent Abstracts of Japan; Abstract of JP 07–124600 A published May 16, 1995.

Patent Abstracts of Japan; Abstract of JP 58–139798 published Aug. 19, 1983.

* cited by examiner

Primary Examiner—Robert Popovics
(74) Attorney, Agent, or Firm—Crowell & Moring LLP

(57) ABSTRACT

The invention relates to a process for dewatering sewage sludges using plate filters, wherein the flocculated sewage sludge treated by means of organic polymer flocculation aids and optionally other auxiliary agents is separated from the major amount of water of the flocculated sewage sludge on a plate filter by means of hydrostatic filtration, whereafter the partially dewatered sewage sludge is subjected to pressure filtration. The plate filters employed have filtrate outlet systems permitting filtrate discharge at a flow rate of 1.0 m/s at maximum. By conducting the process in this way, the dewatering capacity is substantially increased.

15 Claims, No Drawings

METHOD OF DEWATERING SLURRIES USING LEAF FILTERS (FILTER PRESSES)

BACKGROUND OF THE INVENTION

The invention relates to a process for dewatering sludges, preferably municipal sewage sludges in sewage treatment with rapid pressure filters, particularly chamber filter presses and membrane filter presses, using water-soluble polyelectrolytes as flocculation aids in sludge conditioning.

In addition to agricultural utilization, the obligatory disposal of sewage sludges is effected by thermal treatment of the sewage sludge with combustion or degassing and gasification, and predominantly via landfill.

Sewage sludges represent compositions including exceedingly high levels of water, so that both in landfill and in thermal processes, the solids content of the sludge is increased by at least one mechanical dewatering stage, preferably using screen belt presses, centrifuges or pressure filtration. Particularly in improving such dewatering on filter presses, the sludge preconcentrated by thickening has to be conditioned by means of an additional treatment. To this end, the sewage sludge is flocculated using organic, polymeric flocculation aids, preferably high molecular weight cationic polyelectrolytes, and subsequently subjected to dewatering in a batchwise procedure using chamber filter presses or membrane filter presses.

According to EP-B-19176, dewatering can be performed in two steps. Initially, the flocculated sludge is subjected to dewatering in a screening drum or on separate screening belts and collected in an intermediate container, subsequently fed into the chamber filter press using a piston membrane pump or an eccentric screw pump, and filtrated under a pressure of up to 15 bars. Owing to the previous dewatering, this process is remarkable for its shorter batch times in the chamber filter press. However, this advantage is compensated by the measures and time required for the first step of the process.

In gfw-wasser/abwasser 126 (1985), pp. 124–130, V. Zees, T. Clausdorf and G. Gerardts make the supplementary statement that following sludge conditioning and removal of supernatant water, only limited dewatering of the flocculated sludge in the chamber filter press is possible because no sufficient stability of the flocs is achieved for this purpose.

According to K. J. Thomé-Kozmiensky, Klärschlammentwässerung, TK-Verlag K. J. Thomé-K., Neuruppin, 1998, p. 266, polymer conditioning of sewage sludge for dewatering on filter presses is advantageous only in those cases where high demands with respect to shear strength are not made.

Therefore, a dewatering process is known according to EP-A-151,747 wherein the flocculent is metered to the conveyed amount of sludge as a function of sludge density and the sludge thus pretreated is fed directly into the chamber filter press. With pressure times of 3 hours, a dewatered sewage sludge having a dry matter content of 30–40 wt.-% is achieved in the press discharge.

However, this procedure involves the disadvantageous process that the water which is difficult to remove from the sludge flocs is not predominantly withdrawn during pressure filtration and also, those amounts of water in the flocculated sludge mixture already made free of turbidities by flocculation undergo filtration through a developing layer having a filtering effect and compacting under pressure exposure. Consequently, this dewatering process on chamber filter presses which is widely used for sewage sludges involves considerable technical and economical drawbacks.

DE-OS-38 20 110 describes a process wherein the conditioning of sewage sludge is performed using at least two organic polymer flocculation aids having low and high molecular weights, respectively. Again, partial dewatering of the flocculated sludge is possible upstream the chamber filter press.

According to WO 88/03048, previous dewatering is effected on screen belts arranged in a story-like fashion, by means of which the sludge is conveyed to a sludge silo without the use of pumps.

Furthermore, a process is known according to U.S. Pat. No. 4,861,492, wherein sewage sludge is flocculated using polymeric flocculation aids, sedimented, and subsequently held in a rest phase without mechanical load for at least 2 minutes. Thereafter, the supernatant waste water is decanted, and the thickened sludge is subjected to dewatering in a rapid pressure filter with additional flocculant aid. This process requires additional equipment-related input for decanting, as well as time and means to stabilize the flocculated state.

In another process, according to Chem. Ing. Techn. 66, No. 9 (1994), pp. 1222, 1223, the sewage sludge previously added with flotation coal and ashes is subjected to a pressure flocculation in a pressure-resistant flocculation reactor; the flocculated sludge is to reach the filter press without further mechanical stress, and minimum filter drag throughout the feeding cycle is to be ensured.

In $44^{th}$ Purdue Industrial Waste Conference Proceedings, 1990, Lewis Publishers, Inc., Chelsea Mich. 48118, 1989 (1990), pp. 513–518, J. T. Shah reports on the possibilities of optimizing the dewatering process on chamber filter presses by stepwise pressure increase during the dewatering process, thus enabling an increase of the filter cake solids content.

DE 93 07 712 U1 describes a special design of a sludge dewatering press wherein the pressurized air used in secondary pressing subsequently is utilized to blow out the dewatered sludge. By using this sludge dewatering press, the high consumption of pressurized air is intended to be reduced.

DE 93 20 903 U1 describes a filtering means for liquids, particularly swimming pool water, where the liquid to be filtrated is sucked out of a container over filtering elements with precoat filter layer. The design of this filtering means is intended to improve the cleaning operation, i.e., removal and disposal of the consumed filtering aid, and reduce the amount of water required for this purpose.

DE 36 17 519 A1 describes a process and a device for removing residual impurities from a pre-clarified potable liquid, wherein a filter press having precoated layers of filtering aids is used. Here, the structure of the regeneratable layer of filtering aids is regarded as crucial to the invention, precoating with said layer of filtering aids being effected at a specific flow rate. Filtration in the filter press is performed under pressure as usual.

DE 41 19 167 A1 describes a method of determining the characteristics and parameters essential for the sizing and dimensioning of filter presses, as well as a device for performing said method. It is a measuring procedure wherein a hydrostatic pressure corresponding to the previous filtration pressure is applied in the filter chamber, which hydrostatic pressure is continuously monitored in order to detect the pressure drop characteristic of completion of the filtration process.

U.S. Pat. No. 5,275,740 describes a method and a device for controlling the sludge pressure in a filter press and, in particular, for controlling the final pressure of the stepwise and automatic filtration cycles in order to have simultaneous optimization of the press feeding process and to maintain a constant pump pressure. In this case as well, filtration is effected in the press under pressure and in a way previously known from prior art.

JP 07124600 A describes a process and a device for the treatment of organic sludges, wherein the organic sludge initially is flocculated using an organic polymer flocculant and subsequently subjected to dewatering on a filter press using gravity filtration, i.e., solely by the hydrostatic pressure of sludge supplied to the filter press.

Depending on type and amount of organic and mineral components, municipal sludges exhibit diverse, frequently varying properties affecting the dewatering behavior, particularly during flocculation of dispersed solids by means of organic flocculation aids and during filtration. Particularly in the dewatering of municipal sludges on chamber filter presses, the individual operations of the process therefore have to be optimized and balanced. In addition to selecting suitable flocculation aids and apparatus, the dewatering process consequently is controlled by computer-controlled systems where the flocculation aid is metered to the sewage sludge pump at the pressure or suction side, and flocculation is optimized using a floc probe and mixing energy control. Also, with currently common initial feed capacities of 0.15–0.30 $m^3$ of sludge per $m^2$ filter area and hour, conveying of sludge to feed the chamber filter press during the filling phase and the pressure filtration—the latter taking a prolonged period of time—is controlled electronically in a way so as to avoid an excessively rapid pressure increase by means of control, because such an increase would give rise to massive, irreversible compacting of the developing filter cake, thereby affecting the dewatering process. At present, the sludge dewatering capacity of such a process is 6 $m^3$ of sludge per $m^3$ filter volume and hour or 0.09 $m^3$ of sludge per $m^2$ filter area and hour at maximum.

Accordingly, the well-known dewatering processes are characterized in that a dynamic pressure is generated in the system even by sludge conveying of the pumps during the first phase of filtration, which pressure is increased by an augmenting filtration drag caused by simultaneous compacting of the developing filter cake as a result of this process.

Accordingly, the well-known dewatering processes on chamber filter presses involve process operations of complicated structure, which also are expensive because these processes have to performed separately and in multiple stages.

SUMMARY OF THE INVENTION

It was therefore the object of the present invention to find a straightforward process for dewatering sewage sludge or other sludges, which process would meet the requirements of improved technical conditions and reduction in costs. In particular, the object was to find a process for removing the water which is contained in the sewage sludge after polymer conditioning and free of dispersed solids without impairing the shear stability of the flocculated sewage sludge, and without the other drawbacks encountered when performing separate process steps. The object is supplemented by the additional aspect of optionally improving the plate filters as well, namely, in a way so as to be suitable in performing an improved dewatering process, preferably for improving the plate filter feeding process.

According to ATV-Handbuch Klärschlamm, Ernst & Sohn Verlag Berlin, $4^{th}$ edition, 1996, pp. 357 and 358, the chamber filter presses currently employed are constructed in such a way that the filtrate free of solids is discharged via filtrate discharge channels or collecting channels in the plate assembly at the bottom and, towards the end of filtration, at the top as well. With high specific throughput capacities, the hydraulic conditions in the filtrate discharge channels, characterized as drags, represent a limitation, i.e., a bottleneck according to Abwassertechnik No. 2, 1991, pp. 44–48.

According to the ATV manual referred to above, chamber filter presses having open filtrate outlets are also well-known, where the filtrate is discharged from the separate plates through lateral outlets, normally on one side. Particularly due to malodors caused by digester gas or ammonia in an optionally required lime conditioning, such chamber filter presses are not used in sewage sludge dewatering.

It has now been found that dewatering of sewage sludge can be improved considerably according to the process specified in claim 1 where the sewage sludge is subjected to conditioning using at least one organic flocculation aid and optionally other auxiliary agents, and the treated and flocculated sewage sludge is introduced into the plate filter—also referred to as filter press hereinbelow—which is a chamber filter press or a membrane filter press or a frame filter press. Therein, hydrostatic filtration is effected, removing the major amount of water from the treated, flocculated sewage sludge, whereafter the partially dewatered sewage sludge is subjected to pressure filtration. At least 50 wt.-%, preferably at least 60 wt.-%, more preferably at least 70 wt.-% of the water is removed in the first step of the hydrostatic filtration.

The invention is based on the finding that, in a hydrostatic filtration of flocculated sewage sludge, the amount of water of the flocculated sewage sludge mixtures which is largely free of non-dispersed solids can easily be removed in a plate filter by introducing the flocculated amount of solids together with the amount of water into the chamber filter press wherein these amounts are subjected to said straightforward filtration without equipment-related pressure load.

According to the invention, it has also been established that, compared to the conventional filter press feeding operation, the amount of flocculated sludge conveyed to the filter press can be substantially increased in the initial phase of the filtration process, i.e., during hydrostatic filtration.

DETAILED DESCRIPTION OF THE PREFERRED EMBODIMENTS

In performing the process of the invention, filter presses are used that are provided with filtrate discharge channels permitting filtrate discharge at a flow rate of 1.0 m/s at maximum. Thus, in particular, plate filters (filter presses) are used where the filtrate can be discharged through filtrate outlets having large cross-sectional areas, or plate filters having open filtrate outlets or open filtrate outlet systems comprised of single outlets and/or discharge manifolds and optionally other outlet elements, so that each filtrate can discharge at a flow rate of 1.0 m/s at maximum. Such plate filters are well-known but have been used for other purposes until now.

Furthermore, plate filters having closed filtrate outlets can be modified in a way so as to have open filtrate outlets exclusively or partially or additionally, so that the specified value of the filtrate flow rate would not be exceeded. For example, another improvement of the process according to the invention is achieved by optionally enlarging the cross-section of the filtrate collecting channels formed by the corner borings of the plates in the plate assembly, and/or by providing additional openings in least part of the filter plates, preferably in the lower lateral section of the filter plates, in the vicinity of the filtrate outlets that are present. Optionally, the discharging filtrate can be passed through open pipes or grooves arranged on the outlet openings. According to the invention, plate filters according to DE 197 07 167 A1 are also used in this process.

On the whole, short filtration times and high flow rates of sewage sludge, as well as filtrates free of solids are to be achieved in the batchwise dewatering of sewage sludge on filter presses. According to the process of the invention, conveying of the flocculated sewage sludge during the feeding phase is performed at an initial feed capacity of at least 0.3 m$^3$ sludge per m$^2$ filter area and hour, preferably in a range of 0.35–0.70, and more preferably in a range of 0.40–0.60 m$^3$ sludge per m$^2$ filter area and hour. The specified capacity range inevitably results from the flocculation behavior and the flocculation properties of the sewage sludge and the process-related and equipment-related situation resulting therefrom.

In addition, the process offers the advantage of conveying the flocs of sewage sludge and the water to the filter press in a gentle fashion. Towards the end of the feeding phase, the amount of flocculated sewage sludge undergoes compacting in the filled chambers as a result of the hydrostatic filtration, thereby generating a pressure increase throughout the filter press system. During the next phase of pressure filtration, the feed capacity is reduced to values in a range of below 0.3 m$^3$ sludge per m$^2$ filter and hour and down to a selected lower value, the so-called turn-off value, with maximum pressure values ranging from 10 to 20 bars, preferably from 10 to 15 bars being adjusted in the plate filter.

The dewatering process according to the invention is suitable for municipal and/or industrial sludges having solids levels ranging from 0.5 to 15 wt.-%. Primary, excess and activated sludges, as well as mineralized and preferably, digested sludges, as well as mixtures thereof are employed as municipal sludges. The sludges, normally preconcentrated in a concentrator, are subjected to conditioning by treatment with organic polymer flocculation aids, optionally with addition of inorganic and/or organic builder substances such as lime, iron salts, ashes, filter dust, coal fines, and finely divided parts of plants, such as sawdust or chopped straw or mixtures thereof. Water-soluble and/or largely water-soluble, partially crosslinked polymers, co- and terpolymers of water-soluble non-ionogenic and/or ionic monomers and comonomers are used as organic flocculation aids in the form of a powder, as an aqueous solution, or as a water-in-water dispersion, or as a water-in-oil dispersion. Such polymers are homo-, co- and terpolymers of monoethylenically unsaturated monomers having acid groups present at least in part as salts, or their esters with di-$C_{1-2}$-alkylamino-$C_{2-6}$-alkylalcohols or their amides with di-$C_{1-2}$-alkylamino-$C_{2-6}$-alkylamines present in a protonated or quaternized form, such as described in EP-A 113,038 and EP-A 13,416, and optionally other monoethylenically unsaturated monomers.

Preferably, homo- and/or copolymers of monoethylenically unsaturated carboxylic acids and sulfonic acids such as acrylic acid, methacrylic acid, maleic acid, itaconic acid, crotonic acid, and/or their alkali salts, preferably sodium, potassium or ammonium salts, vinylsulfonic acid, acrylamidoand methacrylamidoalkylsulfonic acids, such as 2-acrylamido-2-methylpropanesulfonic acid, 2-sulfoethyl methacrylate and styrenesulfonic acid and/or their alkali salts, preferably sodium, potassium or ammonium salts are suitable as anionic polyelectrolytes, and also, vinylphosphonic acid and styrenephosphonic acid, as well as their alkali salts, preferably sodium, potassium or ammonium salts.

Preferably, cationically active flocculants, e.g. homo- and/or copolymers and/or terpolymers of water-soluble, monoethylenically unsaturated vinyl compounds, such as acrylic acid esters and methacrylic acid esters of dialkylaminoalkylalcohols in protonated or quaternized form, such as dimethylaminoethyl acrylate, acrylic acid amides and methacrylic acid amides of dialkylaminoalkylamines in protonated or quaternized form, such as acrylamidopropyltrimethylammonium chloride and/or acrylamidopropyltrimethylammonium methylmethosulfate are employed, preferably together with acrylamide. Copolymers which can be used according to the invention are also described in EP-B-228,637.

The copolymers can be formed of ionic monomers and non-ionogenic, water-soluble, monoethylenically unsaturated monomers, such as acrylamide, methacrylamide, N-$C_{1-2}$-alkylated (meth)acrylamides, and also with N-vinylamide, vinylformamide, N-vinylacetamide, N-vinyl-N-methylacetamide, N-vinylpyrrolidone. In addition, suitable water-soluble monomers are N-methylolacrylamide, N-methylolmethacrylamide, as well as N-methylol(meth) acrylamides partially or completely etherified with monohydric $C_{1-4}$ alcohols, and diallyldimethylammonium chloride.

Likewise, the copolymers may include limited amounts of ethylenically unsaturated monomers sparingly soluble and/or insoluble in water, such as (meth)acrylic acid alkyl esters and vinyl acetate, as long as the solubility or swellability of the copolymers in water is retained.

In addition, the polymers can be produced using at least bi-reactive monomers, preferably diethylenically unsaturated monomers, so as to have swellability in water or limited solubility therein, or, they may be comprised of water-soluble and water-swellable polymers.

According to the invention, water-soluble or water-swellable amphiphilic copolymers formed of cationic and anionic monomers and optionally non-ionogenic monomers may also be employed.

The flocculation aid is selected using flocculation and dewatering tests on sewage sludges on a laboratory and pilot plant scale. The agents are employed in the form of a 0.05–0.5% aqueous practical solution.

In total, the process according to the invention achieves sludge dewatering capacities of 0.1–0.175 m$^3$ sludge per m$^2$ filter and hour, or more than 6 m$^3$, preferably 6–12 m$^3$ sludge per m$^3$ filter volume and hour.

Furthermore, the procedure of the process according to the invention is characterized by the advantage of short batch times. A short time period of a filter press feeding phase is followed by a pressure filtration phase which is massively reduced in time compared to conventional processes, the time period of which being reduced to 50–20%, preferably 35–25%, relative to the previous pressure filtration time, with comparable values of dry solids content in the filter cake in either case, which range from 30 to 42 wt.-% in the process of the invention when exclusively using organic polymer flocculation aids.

The process according to the invention preferably is performed on chamber filter presses or membrane filter presses, the membrane filter presses achieving additional advantages, particularly a further reduced batch time, as well as a further increased dry solids content. Relative to the filter area per plate level, the size of the filter plates used in the process of the invention is at least 1 m², preferably 1–6 m², more preferably 1–4 m², corresponding to filter plate dimensions of from 1.0×1.0 m to 2.0×2.0 m, for example.

Moreover, the dewatering process of the invention is characterized in that the sewage sludge is flocculated by said conditioning and partially dewatered during hydrostatic filtration in such a way that feeding of the plate filter with sludge—largely in a controlled fashion at present—can be cut down or optionally omitted because the major amount of sludge is introduced into the filter chambers during the hydrostatic filtration.

The invention will be illustrated in more detail with reference to the following Examples.

COMPARATIVE EXAMPLE 1

Dewatering of municipal digested sludge having a solids content (dry matter) of about 4 wt.-% was performed on a chamber filter press by Rittershaus & Blecher Company, type AEHIS, model 1979, having the following characteristics:

| | |
|---|---|
| Plate size | 1.2 × 1.2 m |
| Plate material | GGG (grey cast iron) |
| Number of chambers | 115 |
| Filter area | 250 m² |
| Total press volume | about 3.5 m³ |

Sludge conditioning and feeding of the chamber filter press were effected using the computer-controlled Floctronic® system supplied by Stockhausen GmbH & Co. KG. Fa. Following a flow rate measurement using a feed pump controlled by a pressure gage, the digested sludge was pumped into the filter press. Addition of Praestol® 853 BC cationic flocculation aid was effected as a 0.1 wt.-% aqueous practical solution at the pressure side, as was the subsequent mixing energy control by the floc probe. Initially, the filter press was fed at an initial feed capacity of 50 m³ sludge per hour, corresponding to 0.2 m³ sludge per m² filter area and hour. With a steady pressure increase to a maximum value of 15 bars, the feed capacity was adjusted to a value of 10 m³ sludge per hour by computer control, at which pressure the filtration was completed after a filtration time of 88 minutes. From a pressure of 1 bar on, 75 minutes of this time was required for pressure filtration. A total of 28 m³ sludge was treated with 4.5 kg of Praestol® 853 BC and conveyed into the chamber filter press. The sludge dewatering capacity is 4.2 m³ sludge per m³ filter volume and hour, or 0.06 m³ sludge per m² filter area and hour. The press was opened, and the sludge (filter cake) was obtained with a solids content of 32.6 wt.-%.

EXAMPLE 1

Dewatering of municipal digested sludge having a solids content of about 4 wt.-% was performed on a chamber filter press by Rittershaus & Blecher Company, type AEHIS, having the characteristics specified in Comparative Example 1. The chamber filter press was provided with an open filtrate discharge system. To this end, the borings in the region of the lower filtrate outlet formed by the filter plates, each one provided with a blind plug in the frame of the filter plate in a laterally alternating fashion, were opened towards the closed filtrate outlet and extended to a nominal width of DN25 (25 mm). In addition, each opening was provided with outlet tubes about 30 cm in length.

Sludge conditioning and feeding of the filter presses with digested sludge were performed by means of the apparatus specified in Comparative Example 1, using the Floctronic® system. Praestol® 853 BC in the form of a 0.1 wt.-% aqueous practical solution was used as flocculation aid in conditioning. The flocculated, digested sludge was introduced into the filter press at an initial feed capacity of 120 m³ sludge per hour, corresponding to 0.48 m³ sludge per m² filter area and hour. With ongoing hydrostatic filtration, the major amount of 72 wt.-% of water free of solids, relative to the total amount of water of the treated, flocculated sewage sludge, was separated from the sludge mixture discharging through the open filtrate outlets of the system. Simultaneously, the filter press was continuously fed with conditioned sludge. Once the chambers were completely filled with partially dewatered sludge, the pressure in the filter press increased to a maximum value of 15 bars as a result of the controlled and increasingly reduced feeding with sludge, ultimately being 10 m³ sludge per hour. After a pressure filtration time of 24 minutes and a filtration time totalling 34 minutes, a total of 30 m³ of digested sludge had been conditioned with 4.3 kg of Praestol® 853 BC and dewatered in the chamber filter press. The sludge dewatering capacity is 10.3 m³ sludge per m³ filter volume and hour or 0.144 m³ sludge per m² filter area and hour. The filter press was opened, and a sludge (filter cake) having a solids content of 34.2 wt.-% dry matter was obtained.

The filtration procedure of the invention is characterized by a substantially reduced batch time and, in particular, a short pressure filtration phase.

EXAMPLE 2

Dewatering of municipal digested sludge having a solids content of about 4.6 wt.-% was performed on a chamber filter press by Rittershaus & Blecher Company, type AEHIS, with the modifications described in Example 1. In addition to the open lateral filtrate outlet system, each outlet system above the filtrate channel in the plates was opened with a filtrate outlet having a diameter of DN80 (80 mm) and connected outside the chamber filter press to the filtrate outlet pipe system having a diameter of DN300 (300 mm).

Sludge conditioning and feeding was performed as specified in Example 1, and the flocculated sludge was introduced into the chamber filter press at an initial feed capacity of 120 m³ per hour. After a pressure filtration time of 21 minutes and a filtration time totalling 31 minutes, a total of 30 m³ of digested sludge had been conditioned with 4.3 kg of Praestol® 853 BC and dewatered in the chamber filter press.

What is claimed is:

1. A process for dewatering a flocculated sewage sludge which has been flocculated with at least one organic flocculation aid, said process comprising the steps of:
   providing a plate filter,
   modifying the plate filter to permit an initial feed rate of at least 0.3 m³ sludge per m² filter area per hour and a filtrate discharge flow rate of at most 1.0 m/second,
   introducing the flocculated sewage sludge into a plate filter,
   removing at least 50 wt.-% water from the flocculated sewage sludge in the plate filter by hydrostatic filtration to obtain partially dewatered sewage sludge, and
   thereafter subjecting the partially dewatered sewage sludge to pressure filtration in said plate filter.

2. A process according to claim 1, wherein in addition to said at least one flocculation aid the sewage sludge is conditioned with inorganic and/or organic builder substances.

3. A process according to claim 1, wherein at least 60 wt.-% of the water in the flocculated sewage sludge is removed by hydrostatic filtration.

4. A process according to claim 1, wherein at least 70 wt.-% of the water in the flocculated sewage sludge is removed by hydrostatic filtration.

5. A process according to claim 1, wherein the filtrate is discharged from the plate filter through a closed filtrate outlet system.

6. A process according to claim 1, wherein the filtrate is discharged from the plate filter through an open filtrate outlet system.

7. A process according to claim 6, wherein said open filtrate outlet system is comprised of lateral single outlets from individual plates of the filter.

8. A process according to claim 6, wherein said open filtrate outlet system further comprises at least one collecting channel.

9. A process according to claim 6, wherein said open filtrate outlet system is comprised of at least one filtrate collecting channel.

10. A process according to claim 1, wherein the plate filter is a chamber filter press.

11. A process according to claim 1, wherein the plate filter is a membrane filter press.

12. A process according to claim 1, wherein the pressure filtration uses a maximal pressure in the range 10 bar to 20 bar.

13. A process according to claim 1, wherein the filter plates of the plate filter have an area of at least 1 $m^2$.

14. A process according to claim 1, wherein said sewage sludge is comprised of at least one sludge selected from the group consisting of municipal sludge and industrial sludge and said sewage sludge has a solids content in the range from 0.5 to 15 wt.-%.

15. A process for dewatering a flocculated sewage sludge which has been flocculated with at least one organic flocculation aid, said process comprising the steps of:

providing a plate filter, enlarging the discharge openings of the plate filter to permit an initial feed rate of at least 0.3 $m^3$ sludge per $m^2$ filter area per hour and a filtrate discharge flow rate of at most 1.0 m/second, introducing the flocculated sewage sludge into a plate filter, removing at least 50 wt.-% water from the flocculated sewage sludge in the plate filter by hydrostatic filtration to obtain partially dewatered sewage sludge, and thereafter subjecting the partially dewatered sewage sludge to pressure filtration in said plate filter.

* * * * *